Nov. 12, 1968          G. H. THOMPSON          3,410,324
              SAW AND TRIM GUIDE
              Filed Sept. 30, 1966
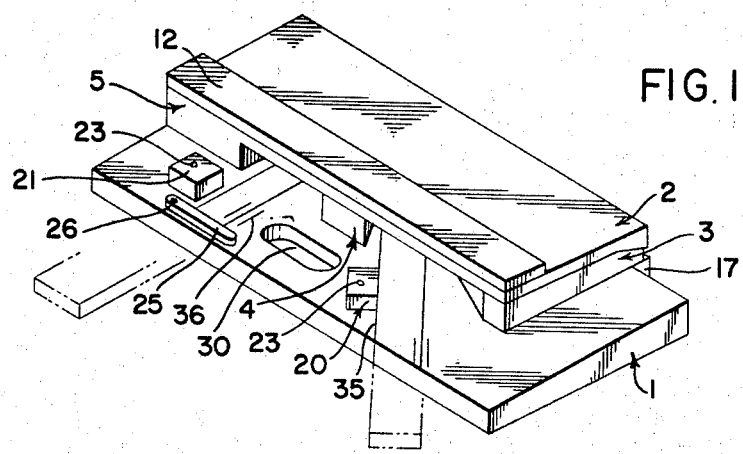
FIG. 1
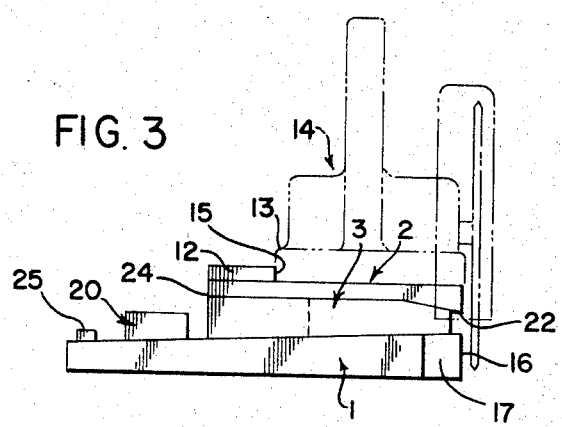
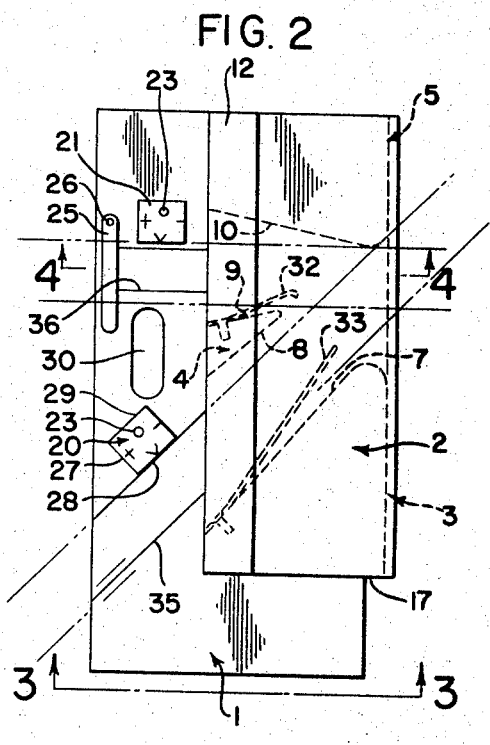
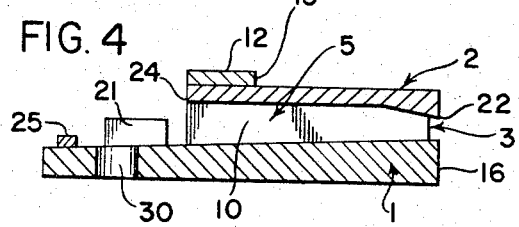
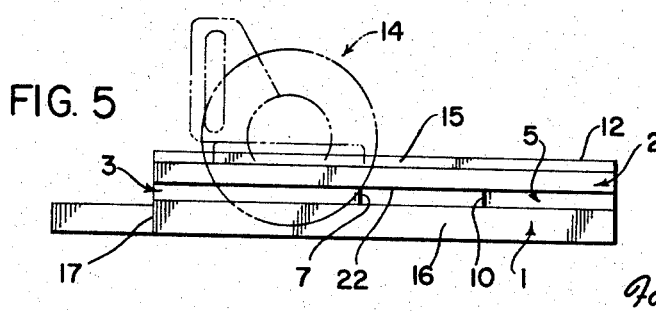
INVENTOR.
GLENN H. THOMPSON
BY
*Fay, Sharpe & Mulholland*
ATTORNEYS

United States Patent Office 3,410,324
Patented Nov. 12, 1968

3,410,324
SAW AND TRIM GUIDE
Glenn H. Thompson, 323 W. Main St.
South Amherst, Ohio 44001
Filed Sept. 30, 1966, Ser. No. 583,338
10 Claims. (Cl. 143—6)

This invention relates to a saw and trim guide for use with an electric saw. More specifically, this invention relates to a guide in which trim is placed at a predetermined angle and which supports a saw to cut the trim.

In the construction business and in the carpenter trade in particular, it is often necessary to cut the wooden or other trim to make a border for doors, windows, walls, etc.

In cutting trim it is desirable to have the side facing the viewer make a perfect joint with the adjoining strip of trim. In order ti make such a joint the hidden or back side of the joint is given a clearance by cutting it back. That is, it is "undercut." Because it is difficult to judge the amount of undercut, it is desirable to have some type of guide.

Another problem exists because of defects or variations in the framing, plaster, wall board, lumber and building materials. To compensate for these variations, the angles of the trim must vary from a perfect cut in order to make a good joint.

A problem also arises when one piece of trim would be cut at an angle slightly in error on the previous saw guide. Subsequent pieces would probably not be in error, or if they were in error, it would be the same error as was in the previous piece so that the error would simply be multiplied rather than corrected.

Saw guides have been devised which permit the positioning of wood trim by means of certain inflexible guides or posts. These saw guides generally had a base portion and an elevated portion on which the electric saw would rest. However, they did not provide for a fine adjustment of the position of the trim nor for means of securely holding the trim in place nor for making an undercut.

The present invention substantially eliminates this problem by means of a saw guide for cutting trim which is provided with a means for providing undercut and overcut and for finely adjusting the angle at which the trim is cut. It also provides means whereby the trim is positioned and securely held in place.

The present invention contemplates a saw and trim guide generally comprising a base which is formed in such a manner that trim may be undercut or overcut on it. A saw table is mounted on the base by means of supporting blocks, and a saw guide is mounted along one side of the saw table in order to insure that the electric saw moves in a linear fashion. Fine adjustment means for varying the angle of the cut on the trim as well as means for securing the trim on the saw guide are provided.

FIG. 1 is a perspective view of the saw guide for cutting trim.

FIG. 2 is a top elevation of FIG. 1.

FIG. 3 is a sectional 3—3 of FIG. 2.

FIG. 4 is a sectional 4—4 of FIG. 2.

FIG. 5 is a rear side view of FIG. 1.

Referring now to the drawings, a base 1 has a sloping cross-sectional configuration. It supports the saw table 2 by means of support blocks 3, 4 and 5.

As seen in FIG. 2, support blocks 3, 4 and 5 are so formed in order to provide paths for the trim at both 90° and 45°. It is obviously possible to use other angles, but these are the most useful ones. The sides 7 and 8 of the support blocks 3 and 4 respectively, are parallel to and face each other and are of an angle of 45° with the front and rear portion of the base 1. The sides 9 and 10 of support blocks 4 and 5, respectively, also face each other and have sections which provide abutment points to form a path which is at an angle of 90° with the front and rear portion of the base 1.

Referring to FIGS. 1 and 4 in particular, saw table 2 has a saw guide 12 mounted thereon. The saw guide 12 is attached to the saw table along its length and for a small portion of its width. The saw guide 12 forms a stop for an electric saw as best seen in FIG. 3. One edge 13 of the saw abuts against the side 15 of the saw guide 12 thereby permitting the saw to be moved in a perfectly linear fashion in order to make an accurate cut on the trim.

The width of the saw guide 12 is determined by the dimension of the electric saw from the blade to the outer edge of the saw 15. This saw guide is movable in order to accommodate different width saws. It should be so designed in order that the blade is directly adjacent to the rear portion 16 of the base 1.

In order to facilitate the use of an electric saw with the present invention, a rectangular section is cut away from the base 1. In this manner an abutment 17 is made, which is encountered by the blade guard on the electric saw when the trim is to be cut. That is, as the saw 14 is brought to the correct position to cut trim, the guard is removed from the blade by contact with the abutment 17.

The saw table begins in the same plane with the abutment 17 which removes the blade guard. While this exact embodiment is not required, it is convenient since at that point the blade is now exposed to cut any trim.

It has been found that if the total length of the base is made approximately twenty-two (22) inches long that the saw table may conveniently be made eighteen (18) inches long, thus, leaving a four inch indentation until the abutment 17 is encountered by the blade guard.

Gauge blocks 20 and 21 are pivotably secured to the base 1. They may be secured to the base by any suitable means 23 such as nails, screws, etc. The gauge blocks 20 and 21 are pivoted at a point other than their center. There are three possibilities with the gauge blocks so positioned since there are three different distances from the sides of the gauge blocks to their securing means 23. Thus if side 27 were used an exact 45° angle cut would be obtained. If side 28 or 29 of the gauge block 20 were used, angles of slightly less than and more than 45°, respectively, would be cut. Gauge block 21 works in the same manner. Very fine adjustments may also be made by using the corners of the gauge blocks 20 and 21. A slight change from the normal angle is often desired if a piece of trim that was previously cut was in error or if the supporting structure has some abnormal variation. It is a simple and economical procedure to cut another piece of trim at a compensating angle so that it will fit with the previous piece or conform to the variation in the frame. For example, if trim is being cut at a 45° angle for a corner and it is noted that the door frame is not perfect or that the previous piece was slightly in error and was cut at 48 or 49°, it is a simple matter to cut the successive piece with which it will fit at 41° or 42° thereby complementing the angle of the previous piece.

In order to position the trim in order to make such a variation, it is a simple matter to pivot the gauge block to present the trim to the cutting edge at a slightly smaller angle and yet securely hold it in position. Incidentally, when cutting a complementary piece of trim for a corner, it must be cut at the opposite 45° angle so that the two pieces will fit together. This is accomplished by simply inverting the trim on one of the cuts and holding it against the bottom surface of the saw table 2. In this manner the trim will abut against a downwardly extending edge 22 at the rear of the saw table 2 and the bottom edge 24 of the front of the saw table 2. The trim, as a result, points in a downward direction. As it is severed, an undercut is made in order to make a clean joint with the previously cut trim which was at the opposite 45° angle. It can be appreciated that if the second piece of trim were merely inverted and placed on the base 1 and severed, an undercut would result.

A trim block 25 in the 90° path cooperates with the sloping base 1 to further add a dimensional variation to the trim. It can readily be appreciated that if a piece of trim were laid flat on the base in the 90° path and cut, that the cut face would be at an angle less than 90° with the top surface of the trim. The exact angle would be equal to the angle made by the sloping top of the base with the rear side. This slight variation is used to make the undercuts which are discussed above. Such cuts are often helpful in making better looking joints or correcting errors induced by other trim much in the same way as that previously discussed. It has been found that a ¼ inch variation between the front and rear portion of the base works well if the base is 12 inches wide. If a perfectly square cut is desired, the trim block 25 is placed in the 90° path. It has thickness which is sufficient, when added to the front height of the base 1, to equal the rear height of the base 1, thus making a level surface. When the trim is placed across the trim block 25 in the 90° path, it is perpendicular to the saw blade and square cut may be achieved.

The trim block 25 may be pivotably secured to the base 1 by a suitable means 26 such as a nail, bolt and nut, etc.

Handle 30 is made in the base 1 by merely cutting an oval shaped opening therein.

Springs 32 and 33 as seen in FIG. 2 are secured to the frontmost section of the support box 3 and 4, respectively. Although other springs may be possible, the springs found to be most desirable here are simply leaf-type springs which have their rest position in the normal path of the trim. As trim is passed into the saw support, it forces itself against the spring, and the gauge blocks. In this manner, the trim is securely held in place at three points with no slack whatsoever. Both hands are then free for use in holding the saw in order to cut the trim.

Guide lines 35 are used in order to assure the carpenter that the trim is properly aligned for the 45° angle cut. The same may be said with respect to the guide lines 36 for the 90° angle cut.

In order to use applicant's trim cutter, a piece of trim is held in the position which it will eventually be placed. It is then marked and placed in the appropriate path of the trim cutter. If the usual undercut is desired the trim block is not used. The gauge block is then positioned in order that the mark on the trim is directly over the cutting edge of the base 1. To correctly position the mark may mean that the angle of the trim will vary slightly but the gauge blocks will securely hold it in the correct position.

For ease of description, the principles of the invention have been set forth in connection with but a single illustrated embodiment. It is not my intention that the illustratetd embodiment nor the terminology employed in describing it be limiting inasmuch as variations in these may be made without departing from the spirit of the invention. Rather, I desre to be restricted only by the scope of the appended claims.

I claim:
1. A saw and trim guide comprising:
a base having front and rear portions;
a saw table on which an electric saw may rest;
a saw guide mounted along the front side of said saw table at a predetermined distance so that a side of the electric saw may abut against it in order to insure that said electric saw moves in a linear fashion;
support blocks between and supporting said saw table and said base, the sides of said support blocks forming continuous paths for substantially the width of the saw table for the insertion of trim between said base and said saw table at predetermined angles;
means on said base for varying said path of said trim.

2. The saw and trim guide of claim 1 wherein said base has a varying thickness having its front portion thinner than its rear portion in order to provide an undercut when said trim is laid on said base and is cut.

3. The saw and trim guide of claim 2 wherein said saw table has a downwardly extending rearward edge.

4. The saw and trim guide of claim 2 wherein one of said paths formed by said support blocks is at 45° and another is at 90° with the front of said base.

5. The saw and trimguide of claim 2 wherein said means for varying said paths includes a pivotably secured gauge block beside the path for the trim.

6. The saw and trim guide of claim 5 wherein said gauge block is pivotably secured at a point other than its center whereby it may project different amounts into the path of the trim and thereby enable said trim to be securely held while angles slightly different than the normal one are cut.

7. The saw and trim guide of claim 6 wherein leaf springs are provided on the sides of said support blocks in order to aid said support blocks in securely holding said work piece while it is being cut.

8. The saw and trim guide of claim 4 wherein a trim block is provided along said 90° path to vary the angle between the cut face and top of the trim.

9. The saw and trim guide of claim 2 wherein leaf springs are provided on the sides of said support blocks in order to aid said support blocks in securely holding said said work piece while it is being cut.

10. The saw and trim guide of claim 8 wherein a protruding abutment is located at the rear of said base so that a blade guard on said electric saw may contact it and retract.

References Cited

UNITED STATES PATENTS

| | | | |
|---|---|---|---|
| 2,396,961 | 3/1946 | Meredith | 143—6 |
| 2,599,893 | 6/1952 | Butler | 143—6 |
| 3,151,641 | 10/1964 | Kimm et al. | 143—6 |
| 3,168,126 | 2/1965 | Konopka | 143—6 |

DONALD R. SCHRAN, *Primary Examiner.*